Nov. 18, 1941.                P. PROCISSI                2,262,963
                         FLUID PRESSURE ENGINE
                          Filed Nov. 25, 1940
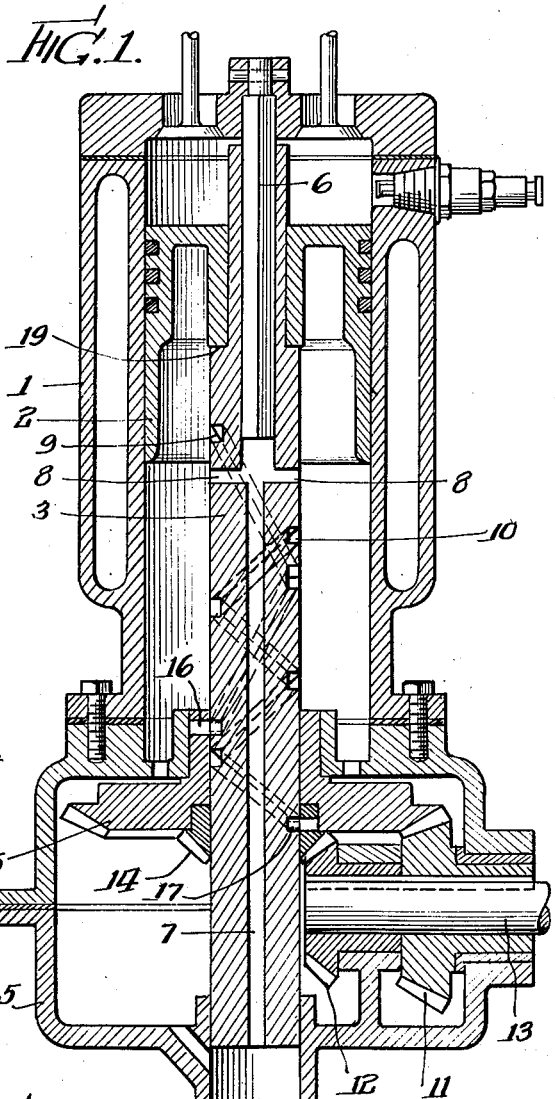
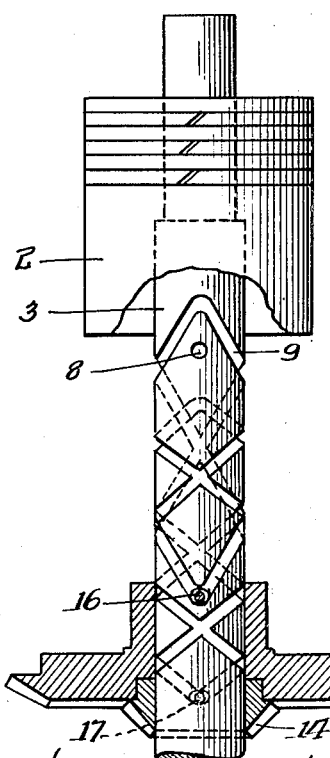
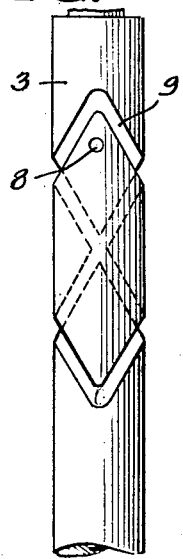
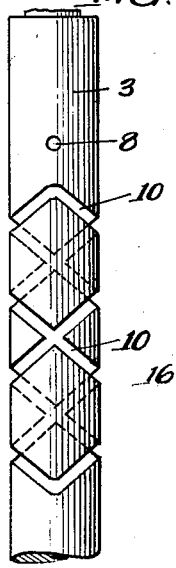
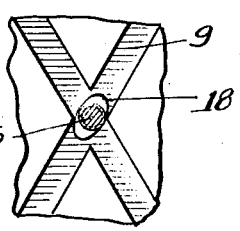
INVENTOR.
Peter Procissi
BY: Arthur H. Durand
              Atty Patented Nov. 18, 1941

2,262,963

UNITED STATES PATENT OFFICE 2,262,963

FLUID PRESSURE ENGINE

Peter Procissi, Chicago, Ill.

Application November 25, 1940, Serial No. 367,033

10 Claims. (Cl. 121—119)

This invention relates to fluid pressure engines, and more particularly those of a high speed type, and especially to those that have no crank shaft.

Generally stated, the object of the invention is to provide a novel and improved construction whereby a crankless transmission is provided between a reciprocating piston and a rotating drive shaft, of such form that the rotation of the drive shaft will be of high velocity, but with practically a minimum of reciprocation of the piston for the torque and speed given the drive shaft.

It is also an object to provide certain details and features of construction and combinations tending to increase the general efficiency and desirability of a crankless engine transmission of this particular character.

To the foregoing and other useful ends, the invention consists in matters hereinafter set forth and claimed and shown in the accompanying drawing, in which—

Fig. 1 is a vertical section of an engine involving the principles of the invention.

Fig. 2 is a side elevation of the piston and piston rod of one of the bevel gears shown in Fig. 1 of the drawing.

Figs. 3 and 4 are side elevations of the piston rod in the nature of diagrams showing the two separate grooves of the piston rod.

Fig. 5 is an enlarged detail fragmentary view showing a detail of construction.

As thus illustrated, the invention comprises the cylindrical cylinder 1 of an internal combustion engine, with a reciprocating cylindrical piston 2 therein. While the invention is thus shown as an internal combustion engine, it will be understood that the said piston could be driven by steam or compressed air or any other fluid pressure.

Said piston is rigidliy secured to the upper end portion of a cylindrical piston rod 3, the lower end of which slides up and down in the cylindrical chamber 4, depending from the under side of the gear casing 5 that is secured to the bottom or lower end of the said cylinder. The said vertically reciprocating piston rod is held against turning by a square rod 6, or a rod of other formation, that extends downwardly in a similarly shaped chamber in the upper portion of the piston rod, whereby the piston and said rod are prevented from rotating about a vertical axis. Said piston rod has an oil duct 7 whereby oil from the chamber 4 may be forced upwardly and out of the ports 8 into the chamber of the cylinder. In addition, the outer cylindric surface of said piston rod 3 has an endless spiral groove 9, and a second endless spiral groove 10. These grooves are shown more or less diagrammatically, but in actual practice it will be understood that they are curved and that they extend spirally around the piston rod, for the latter is cylindrical externally thereof.

The two bevel gears 11 and 12 are mounted on the horizontal drive shaft 13, and for that purpose are supported by suitable bearings on the casing 5, in the manner shown in Fig. 1 of the drawing. These two gears are both rigid with the said drive shaft. Engaging said gears are the relatively small bevel gear 14 and the relatively large bevel gear 15 on the piston rod. The gear 15 has a pin 16 that engages the groove 9 previously mentioned, and the gear 14 has a pin 17 that engages the groove 10 previously mentioned. The driving power of the engine is from gear 15 to gear 11, at a ratio of, say, two to one, whereby the shaft 13 will rotate approximately or substantially twice as fast as does the said gear 15 from which the power is derived. When the piston travels upwardly, the power transmission is from the gear 12 to the gear 14, at a ratio of, say, one to one, substantially, and it will be understood that it is the momentum of the fly wheel (not shown) on the drive shaft 13, that keeps the engine transmission moving during the return stroke of the piston. But various ratios could be used, for said gears, depending upon circumstances, and the invention is not limited to any particular ratio. With this construction, when the piston 2 is forced downward by fluid pressure, as by the explosion in an internal combustion engine, the pin 16, in engagement with the groove 9, causes a rapid rotation of the gear 15, with the result that the drive shaft 13 is rotated in the manner set forth. When the pin 16 reaches the lower end of the groove 9, the fly wheel and drive shaft, and the gear 12, then function through the gear 14 to cause the piston rod and piston to move upward. Attention is particularly directed to the fact that in accordance with the present invention the piston rod 3 on the down or power stroke causes rotation of the gear 15 for rotating shaft 13. In other words, the transmission of power occurs by virtue of impingement of the upper surface of the groove 9 upon the pin or cam follower 16. Thus, the slot or groove 9 provides an upper or cam surface extending along or axially of the rod member 3 but having a predetermined relatively acute angle of inclination with respect to the axis of the rod. Accordingly, therefore, in acting against the pin 16, the cam surface exerts a major component of force against the pin 16 in a direction normal to the axis, or in other words, in such a direction as to tend to rotate the gear 15, a minor component of force being applied in a downward direction. This, therefore, assures ready rotation of the gear 15 free from binding stresses.

On the other hand, it is to be noted that the pin or follower 17 on the gear 14 engages with a cam slot 10 which has a relatively greater angle of inclination with respect to the axis of the rod 3. The slot 10, accordingly, provides what are in effect spiral cam surfaces coacting with the follower 17. Attention is specifically directed, however, to the fact that were the present machine dependent upon the coaction of the slot 10 and the follower 17 for transmission of power on the downward stroke, a relatively decreased ratio between the lateral and the downward components of driving force would result. That is to say, the component of force tending to rotate the gear 14 by virtue of impingement of the cam slot shoulder portion upon the pin 17 is substantially decreased due to the increased angle of inclination of the slot. Conversely, however, upon return of the piston and piston rod toward upward position under the influence of rotation of the shaft 13, the ultimate function is not rotation of gears 14 and 15, but that of effecting longitudinal movement of the reciprocating parts. It will be evident from the foregoing that herein the exhaustion of a substantial component axially of the reciprocating members is of prime importance and it is at this time that the coacting spiral cam groove 10 and follower 17 prevent the important function.

In short, the present invention contemplates particularly the provision of a plurality of inclined or cam surfaces, one adapted particularly to facilitate rotary movement of one of the gears when the engine is on its power stroke and the other adapted to transmit substantial axial forces to the reciprocating parts when on their return stroke. Applicant has accordingly discovered that a groove designed favorably to efficient creation of rotary movement in response to the power stroke of a reciprocating movement is not properly adapted to retransform rotary movement into reciprocating movement on the reverse stroke of the parts. Accordingly, therefore, there have been provided means for performing each of these functions in the most efficient manner.

Attention is moreover particularly directed to the fact that gear ratios between gears 15 and 11 and 14 and 12 are selected in accordance with the ratio of rotation between the gears 15 and 14 respectively and the timed reciprocation of the rod 3. In other words, in the embodiment shown, gear 15 rotates once for every upward or downward stroke of the engine whereas gear 14 in the same interval rotates twice. Accordingly, therefore, gear 15 is connected to shaft 13 through a two to one gear ratio whereas gear 14 is connected to the same shaft by a one to one gear ratio. In other words, it will be seen from the foregoing that the gear ratios are inversely selected so that shaft 13 operates in timed relation to the rod 3 through either of the dual driving connections. Of course, the four bevel gears all rotate at predetermined fixed speeds, in unison, but they take turns at transmitting the power, first from the piston to the drive shaft and fly wheel, and then from the latter back to the piston. The power of the engine is thus exerted intermittently to perform work, but the powerful down stroke of the piston will rotate the drive shaft and the fly wheel at such high velocity that there will practically be no slackening of the speed of the transmission of power and motion to do the required work, such as driving an automobile, a motor-boat, or anything else. The speed of the engine can be increased by using grooves of different lengths or shapes, and by using different ratios for the gears, and if desired, a step-down gear transmission can be used between the drive shaft 13 and the driving axle of an automobile or other machine. In any event, the extremely high speed and high velocity of the engine drive will tend to economize in the use of fuel for the engine, or in the use of fluid pressure of any kind. As there is no crank shaft, there will be no off-center vibration of any kind whatever.

If desired, a shoe 18 can be pivotally mounted on the pin 16 or on the pin 17, the shoe being elongated lengthwise of the groove in which it travels. This is shown very clearly in Fig. 5 of the drawing.

It will also be seen that the gears 14 and 15 are supported by the gears 11 and 12 on the drive shaft.

In addition, it will be seen that lubricating oil is free to drain back from the interior of the cylinder into the gear casing, and from the latter into the depending chamber 4 that forms a receptacle for said oil, ducts or openings being provided for this purpose in the cylinder casing and in the gear casing, as shown very clearly in Fig. 1 of the drawing.

It will also be understood, of course, that the piston 2 need not be rigid with the piston rod 3, but may be loose thereon if desired, and supported by a shoulder 19 formed on the piston rod. In other words, the important thing is that the piston rod be held against rotating about a vertical axis, but there is a choice of whether the piston shall be rigid with the piston rod, or whether it shall be free to rotate thereon.

Of course, it will be understood that the piston rod is made of steel hard enough to prevent any appreciable or perceptible wear in the grooves, and that for the same purpose the pins 16 and 17 are also made of steel of the necessary hardness and other qualities to prevent them from breaking and to prevent them from wearing, for with properly arranged lubrication, with the right kind of lubricating oil, there should be no appreciable wear in the grooves or on the pins.

The engine is a high speed engine in this sense: That while the reciprocation of the piston may be fairly slow, or at least not unusually fast, it is nevertheless true that the output of the engine through the drive shaft and fly wheel is a high velocity proposition, a high speed proposition, that can be taken advantage of in driving an automobile or a motorboat, or anything else, in an advantageous manner.

What I claim as my invention is:

1. A fluid pressure engine comprising a reciprocating piston, a reciprocating piston rod for said piston, a drive shaft, and means comprising two bevel gears on said piston rod and two bevel gears on said drive shaft for converting the power stroke of the piston into rotation of the drive shaft, and for then converting the momentum of the drive shaft and anything thereon into power for effecting the return stroke of said piston.

2. A structure as specified in claim 1, said piston rod having one endless spiral groove for engaging a portion of one bevel gear on the piston rod, and having another endless spiral groove for engaging a portion on the other bevel gear on said piston rod.

3. A structure as specified in claim 1, comprising means for preventing said piston and piston rod from rotating about the axis thereof.

4. A structure as specified in claim 1, the gears on the piston rod being supported by the gears on the drive shaft.

5. An engine comprising a reciprocating member and means to apply driving power to said member in one direction of reciprocation, a driven shaft, and means for operatively interconnecting said member to said shaft in driving relation comprising a pair of cam surface means associated with said member and inclined with respect to the axis of movement thereof, one cam surface means making a relatively acute angle of inclination with the said axis of movement for effecting efficient rotation of the shaft on the power stroke and the other of said cam surface means making a relatively less acute angle for effecting efficient movement of the reciprocating member on its return stroke.

6. In an engine comprising a reciprocating member and means to apply driving power to the member in one direction of reciprocation, a driven shaft and means operatively interconnecting said member and said shaft in driving relation comprising a driving surface inclined with respect to the axis of movement of said member and operatively connecting said member and said shaft for movement in predetermined timed relation, a second driving surface inclined with respect to the axis of movement of said member and operatively connecting said member and said shaft for movement in predetermined timed relation, one of said driving surfaces making a substantially more acute angle with respect to the axis of movement of said member than the other of said driving surfaces.

7. In an engine comprising a reciprocating member and means to apply driving power to the member in one direction of reciprocation, a driven shaft and means operatively interconnecting said member and said shaft in driving relation comprising a driving surface inclined with respect to the axis of movement of said member and operatively connecting said member and said shaft for movement of said shaft in predetermined timed relation on the power stroke of said reciprocating member, a second driving surface inclined with respect to the axis of movement of said member and operatively connecting said member and said shaft for predetermined timed reciprocation of said member in response to rotation of the shaft on the return stroke, one of said driving surfaces making a substantially more acute angle with respect to the axis of movement of said member than the other of said driving surfaces.

8. In an engine comprising a reciprocating member and means to apply driving power to the member in one direction of reciprocation, a driven shaft and means operatively interconnecting said member and said shaft in driving relation comprising a driving surface inclined with respect to the axis of movement of said member and operatively connecting said member and said shaft for movement of said shaft in predetermined timed relation in one direction of movement of the reciprocating member, a second driving surface inclined with respect to the axis of movement of said member and operatively connecting said member and said shaft for predetermined timed reciprocation of said member in response to rotation of the shaft in the other direction of movement of the reciprocating member, one of said driving surfaces making a substantially more acute angle with respect to the axis of movement of said member than the other of said driving surfaces.

9. In an engine comprising a reciprocating member and means to apply driving power to the member in one direction of reciprocation, a driven shaft and means operatively interconnecting said member and said shaft in driving relation comprising a driving surface inclined with respect to the axis of movement of said member and operatively connecting said member and said shaft for movement of said shaft in predetermined timed relation on the power stroke of said reciprocating member, a second driving surface inclined with respect to the axis of movement of said member and operatively connecting said member and said shaft for predetermined timed reciprocation of said member in response to rotation of the shaft on the return stroke, one of said driving surfaces making a substantially more acute angle with respect to the axis of movement of said member than the other of said driving surfaces, both of said interconnecting means being constructed and arranged to connect said shaft and said reciprocating member in substantially the same timed relationship.

10. In an engine comprising a reciprocating member and means to apply driving power to said member in one direction of reciprocation, a driven shaft and means operatively interconnecting said member with said shaft in driving relation and comprising a cam surface disposed at an angle inclined with respect to the axis of movement of said member and follower means rotatable by said cam and connected to said shaft for rotation thereof on the power stroke of the reciprocating member, a second cam surface disposed at a relatively greater angle of inclination with respect to the axis of movement of said member and associated with a second rotatable follower connected to said shaft and operative to shift said member on its return stroke in response to rotation of said shaft.

PETER PROCISSI.